April 7, 1936.　　　　　G. F. DALY　　　　2,036,683
TABULATING MACHINE
Filed April 17, 1931　　8 Sheets-Sheet 1

INVENTOR
George F. Daly
BY his ATTORNEY

April 7, 1936.　　　　G. F. DALY　　　　2,036,683
TABULATING MACHINE
Filed April 17, 1931　　　8 Sheets-Sheet 2

INVENTOR
George F. Daly
BY his ATTORNEY

April 7, 1936.  G. F. DALY  2,036,683

TABULATING MACHINE

Filed April 17, 1931  8 Sheets-Sheet 3

INVENTOR
George F. Daly
ATTORNEY
A. C. Maby

April 7, 1936.　　　　　　G. F. DALY　　　　　　2,036,683
TABULATING MACHINE
Filed April 17, 1931　　　8 Sheets-Sheet 4

April 7, 1936.　　　　　G. F. DALY　　　　　2,036,683
TABULATING MACHINE
Filed April 17, 1931　　　8 Sheets-Sheet 5
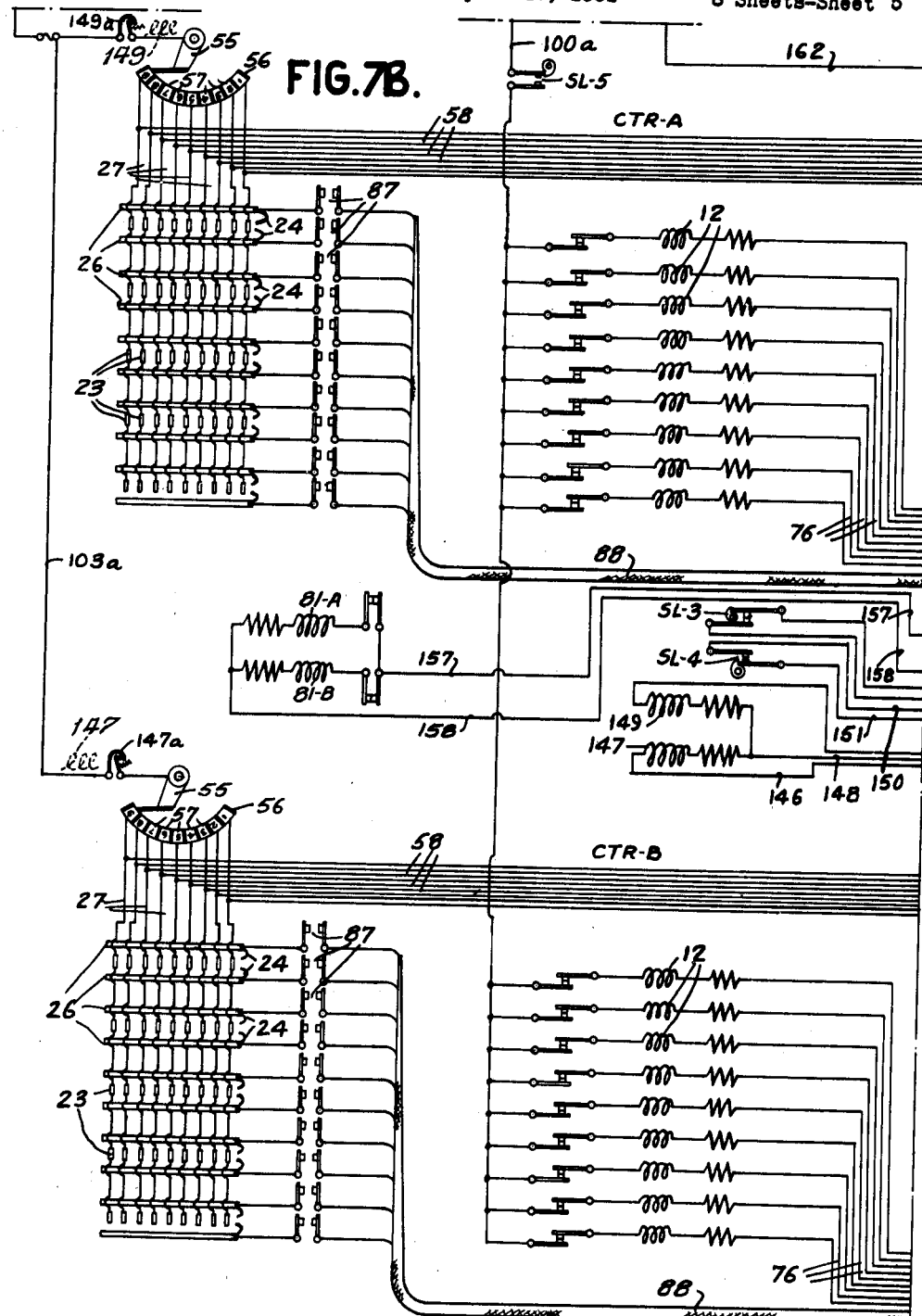

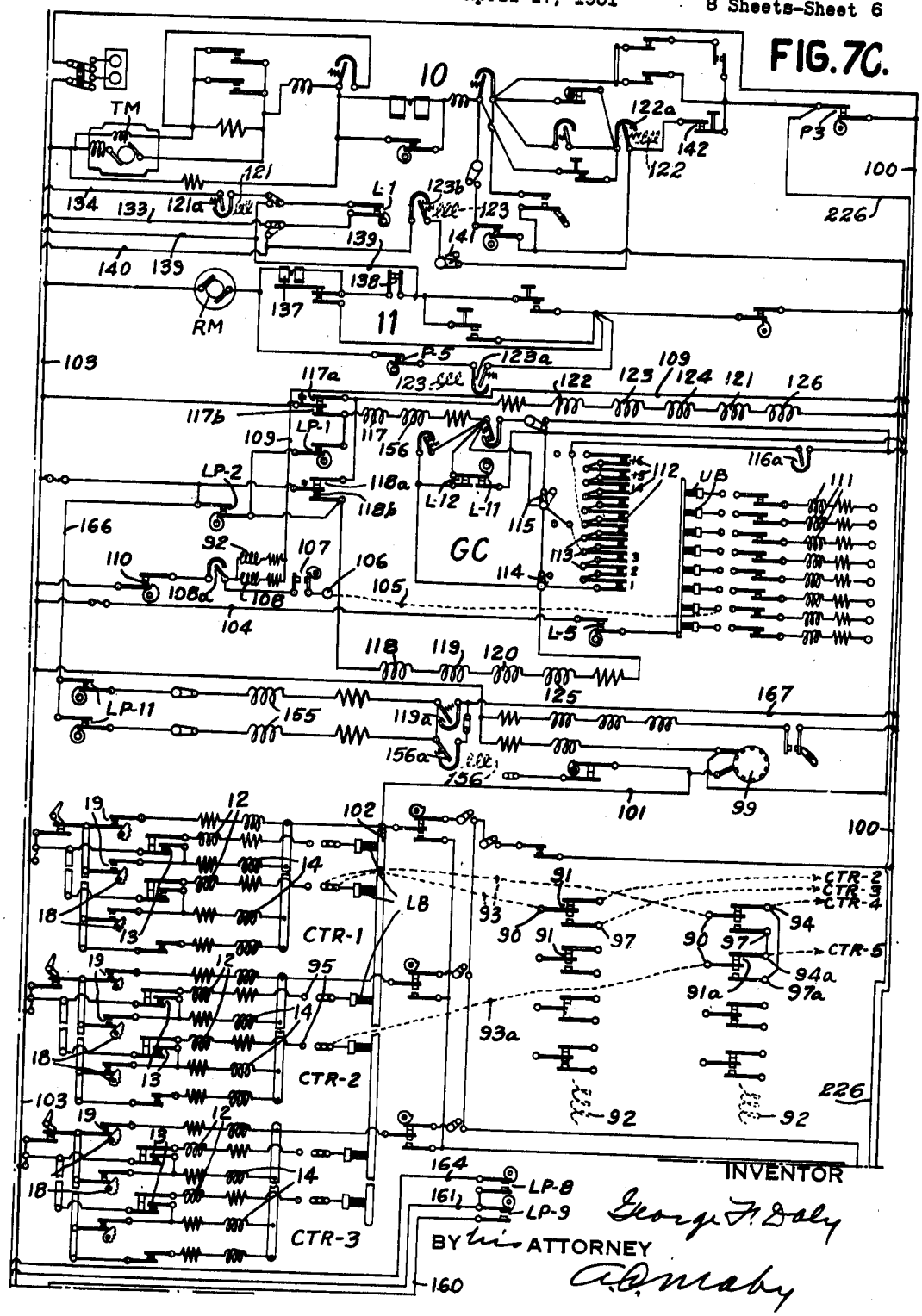

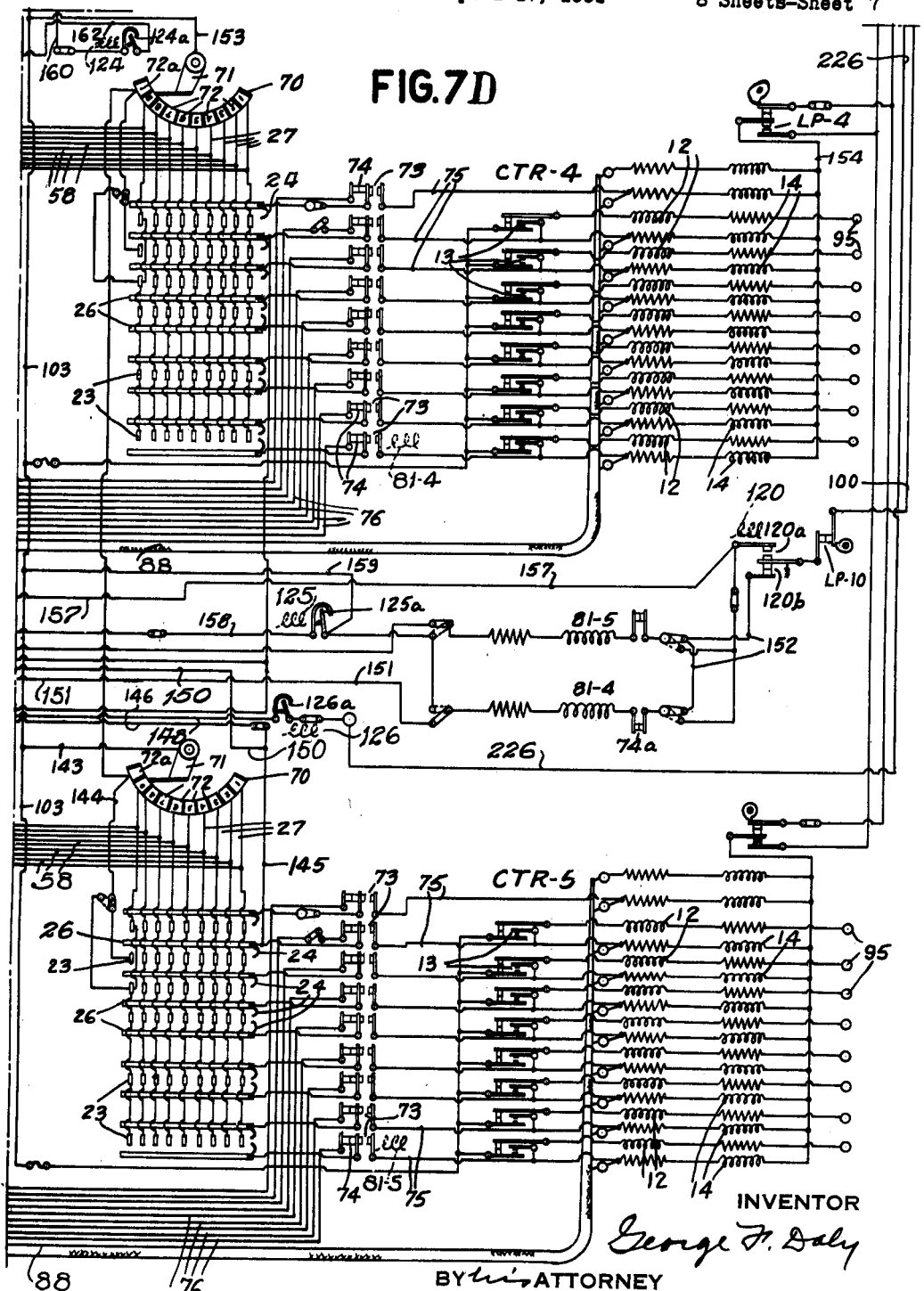

April 7, 1936.  G. F. DALY  2,036,683
TABULATING MACHINE
Filed April 17, 1931   8 Sheets-Sheet 8

FIG.10.

| CARD CREDIT | DEBIT | CTR.#1 | | CTR.#2 | CTR.#3 | CTR.#4 | | CTR.#5 | | CTR. A | CTR. B |
|---|---|---|---|---|---|---|---|---|---|---|---|
| 50 | 9950 | 73 | 501 | 50 | | | 50 | 9950 | | | |
| 38 | 9962 | 73 | 501 | 38 | | | 38 | 9962 | | | |
| 9980 | 20 | 73 | 502 | 88 | 20 | 88 9980 | | 9912 20 | | 88 | |
| BLANK | | 73 | 503 | | 20 | 68 | | 9932 | | 156 | |
| 80 | 9920 | 73 | 504 | 80 | | 68 80 | | 9932 9920 | | 224 | |
| 9920 | 80 | 73 | 505 | 80 | | 148 9920 9920 9920 9920 | | 9852 80 80 80 80 | | 372 | |
| 9920 | 80 | 73 | 505 | | | | | | | | |
| 9920 | 80 | 73 | 505 | | | | | | | | |
| 9920 | 80 | 73 | 505 | | | | | | | | |
| 10 | 9990 | 73 | 506 | 10 | 320 | 9828 10 | | 172 9990 | | | 172 |
| 9970 | 30 | 73 | 507 | 10 | 30 | 9838 9970 | | 162 30 | | | 334 |
| BLANK | | 73 | 508 | | 30 | 9808 | | 192 | | | 526 |
| 9960 | 40 | 73 | 509 | | 40 | 9808 9960 | | 192 40 | | | 718 |
| 25 | 9975 | 73 | 510 | 25 | 40 | 9768 25 | | 232 9975 | | | 950 |
| | | | | 25 | | 9893 | | 207 | | | 1157 |

FIG.9

| ACCT. NO. | DATE | DAILY TOTAL | | DAILY BALANCE | |
|---|---|---|---|---|---|
| | | CR. | DB. | CR. | DB. |
| 73 | 501 | 88 | | 88 | |
| 73 | 502 | | 20 | 68 | |
| 73 | 503 | | | 68 | |
| 73 | 504 | 80 | | 148 | |
| 73 | 505 | | 320 | | 172 |
| 73 | 506 | 10 | | | 162 |
| 73 | 507 | | 30 | | 192 |
| 73 | 508 | | | | 192 |
| 73 | 509 | | 40 | | 232 |
| 73 | 510 | 25 | | | 207 |
| | | | | 372 | 1157 |

FIG.8.

| ACCT. NO. | DATE | AMOUNT | COMPLEMENT | K |
|---|---|---|---|---|
| 0 | | ooo o | | o |
| 1 | o | | | |
| 2 | | | | |
| 3 | o | | | |
| 4 | | | | |
| 5 | o | o | o | |
| 6 | | | | |
| 7 | o | | | |
| 8 | | | | |
| 9 | | | ooo | |

INVENTOR
George F. Daly
BY his ATTORNEY

Patented Apr. 7, 1936

2,036,683

UNITED STATES PATENT OFFICE 2,036,683

TABULATING MACHINE

George F. Daly, Johnson City, N. Y., assignor, by mesne assignments, to International Business Machines Corporation, New York, N. Y., a corporation of New York Application April 17, 1931, Serial No. 530,860

9 Claims. (Cl. 235—92)

This invention concerns accounting machines and more particularly accounting machines of the record controlled tabulator type.

The principal object of the invention is to provide a tabulating machine of improved selectivity of operation and of increased utility together with simplification and improvement of the mechanical structure with a view to imparting additional operating features as well as improvement in and increased efficiency and utility of the features previously found in such machines.

A more specific object of the invention is to provide a mechanical accounting system in which an accounting machine may be remotely controlled from another accounting machine and in which through improved mechanism the machines need not be synchronous in their operation although, owing to the flexibility of the system it is possible to obtain synchronous operation.

Another object is to provide a system of the type specified in the preceding paragraph in which data manifesting devices in both machines may be controlled by differentially timed operations and these may be timed electric impulses, if desired.

Another object is to provide an accounting system in which a controlling accounting machine may be associated by plugging with a receiving accounting machine and in which timed electric impulses are emitted from the controlling machine to cause operation of the receiving machine.

A further object is to devise an accounting system in which an accounting machine is remotely controlled from another accounting machine and in which both machines are provided with independent driving means.

A further object is to provide a machine having accumulating mechanism adapted to be controlled by a tabulating machine controlled by record cards bearing index point designations.

Another object is to provide a system including remotely controlled accounting machines in which one of said machines is of the tabulator type provided with totalizers and printing mechanism and another is of the tabulator type having only totalizers and in which the totalizers of the second machine are controlled in accordance with the data in the totalizers of the first machine and the totalizers of the second machine in turn control the printing mechanism of the first machine.

In the accounting machine art machines have been developed in which provision is made for transferring amounts or totals from one accumulator to another. Such devices have heretofore been generally of mechanical construction and have necessitated complicated structural arrangements. The transferring operations have further been restricted in their effect to mechanisms in a single machine and the sending and receiving accumulators were of necessity synchronous in their operation. Furthermore, the mechanical complication of such devices is greatly increased when provision is sought for selectively transferring amounts from any of a plurality of accumulators in one machine to any other accumulator in another machine and from thence transferring the result of the combined amounts of the two accumulators to the printing mechanism of the first machine.

Another object of the invention is to provide selecting mechanism for determining which a plurality of accumulators in one machine shall control the operation of an accumulator in other machine.

A further object resides in the provision of improved means for transferring totals from an accumulator in one machine to another accumulator in another machine and the further transferring of the result of such successive transfer from the second accumulator back to printing mechanism in the first machine.

Various other objects and advantages of my invention will be obvious from the following particular description of one form of mechanism embodying the invention or from an inspection of the accompanying drawings; and the invention also constitutes certain new and novel features of the construction and combination of parts hereinafter set forth and claimed.

Figure 7A:
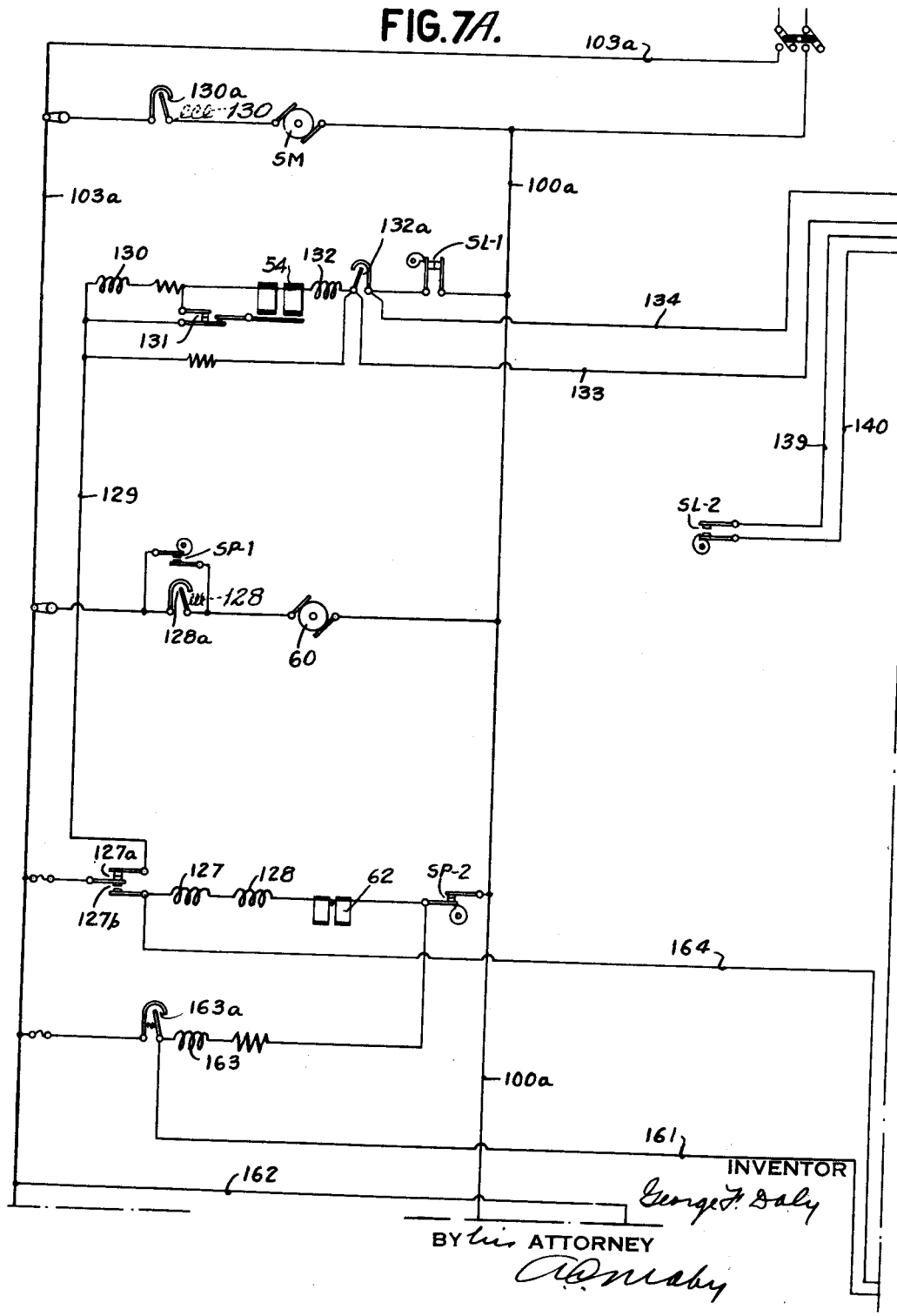

Figs. 7A, 7B, 7C, and 7D taken together form a complete wiring diagram of the apparatus. Figs. 7A and 7B placed one above the other represent the secondary unit. Figs. 7C and 7D placed one above the other represent the printing tabulator.

Figs. 7A and 7B when placed to the left of Figs. 7C and 7D show the correct arrangement of circuits.

Fig. 8 is a fragment of a detail card.

Fig. 9 is a fragment of a printed record.

Fig. 10 is a table showing the successive steps in the operation of preparing the printed record of Fig. 9 from a series of detail cards.

In order that the detail description may be followed to better advantage, a general statement will be herein given of the operation of the specific embodiment of the invention shown and the system will be described as being applied to a problem of a banking institution but it is understood that the invention may with equal facility be used in many other commercial establishments and in many other relations.

It is the practice in certain banks to prepare a perforated record card for each transaction that takes place between the bank and a customer. Upon such record may be entered the customer's account number, the date of the transaction, the amount, and an indication as to whether the transaction is to be credited or debited to the account. The complement of the amount may also be punched in a separate field of the card for use in tabulating balances. Such a card may be of the form shown in Fig. 8 which illustrates the well-known Hollerith type card and which usually has twelve index point positions. The nature of the transaction is indicated in the column headed K, a perforation in the "11" index point position indicating a debit card and its absence denoting a credit card.

The cards are arranged according to account number and date and at stated periods are run through the usual Hollerith type printing tabulator to obtain a summation of the various accounts which is usually the "total amount booked in credit", the "total amount booked in debit" and "the balance in debit" or "credit" as the case may be. In the distribution of interest on these accounts it has been the practice to obtain the balance for each day's transactions for each account and compute the day's interest thereon, adding the successive interest amounts to obtain the balance of interest payable at the end of the stated period. This has heretofore been a time-consuming task requiring the use of adding facilities and much multiplication of daily balances by interest rates per diem.

In the present arrangement provision is made to automatically accumulate a sum of all daily balances for the period, which upon multiplication by the interest rate per diem will result in the amount of interest for the period. A sample of such a record is shown in Fig. 9 whereon each day's transactions are recorded together with the daily balances and the total of such balances. Thus 372 is the sum of the credit balances and 1157 is the sum of the debit balances. Each may then be multiplied by its rate of interest per diem, if such rates be different and the difference between the products will be the interest due to the bank or the customer as the case may be.

The operation may best be explained in connection with a specific problem which may be that indicated in the drawings. Presuming it to be desired to obtain the balance of interest due on all accounts for the period May 1 to May 10 the cards are sorted to account number and each group of cards representing a customer's account is further sorted to chronological sequence.

Blank cards punched with the date and account number only are inserted in the proper sequence for those days on which no transactions were had. The machine is set in the usual way to operate automatically; feeding the cards one by one and distributing the data to the various counters as graphically indicated in Fig. 10. In this figure the column headed "Card" indicates the data punched in the separate cards. Columns headed CTR#1, CTR#2, CTR#3, CTR#4 and CTR#5 indicate the five counters of the printing tabulator shown in Fig. 1. Columns headed CTR—A and CTR—B indicate the two counters of the secondary machine also shown in Fig. 1.

The record prepared may be of the form shown in Fig. 9 wherein only the totals of the several groups are printed or a more detailed record may be prepared in which the items on the separate cards are listed.

Referring now to Fig. 10, the first line of this diagram indicates that a credit of 50 is perforated on the record card together with the complement of this number, namely 9950. This amount is analyzed by the usual reading brushes and the amount 50 entered into CTR#2 and CTR#4 and the complement thereof is entered in CTR#5. At the same time the account number 73 and the date 501 are printed directly on the report as in Fig. 9 on the first line thereof. These two values are incidentally entered into CTR#1. The printing of the account number and date and the incidental entry into a counter is in accordance with the well-known method of group indicating which is fully explained and described in the patent to Lake and Page No. 1,757,123, issued May 6, 1930. Suffice it to say that after the printing of the account number and date on the first line of the record paper spacing is suppressed so that at the end of the tabulation of a group of cards the total to be printed under control of the counters will appear on the same line.

It is also pointed out in the patent referred to that the items entered into CTR#1 are not total printed. The second card, as indicated in Fig. 10, contains the credit amount 38 and its complement 9962. These amounts are also entered in counters #2, #4, and #5. The machine is provided with the well-known automatic control mechanism arranged for minor controlling on the date and major controlling on account number. Upon change in date a transfer cycle of operations is automatically initiated during which the machine senses which of the two counters #4 or #5 contains a positive balance and transfers such balance to either counter A or counter B of the secondary machine.

In the present instance the tabulation of the group of cards for the first day of the fifth month results in a positive balance of 88 which is automatically transferred to counter A. Following this transfer cycle an automatic total printing cycle takes place during which the balance 88 is printed on the record sheet under control of CTR#4. The total in CTR#2 is also printed in the column headed "Daily total—Cr." which indicates the daily credit totals. After these amounts have been printed CTR#2 is reset to zero as is also CTR#1, nothing having been printed from the latter. The machine then resumes feeding the cards of the second group representing transactions of the second day. As indicated this card represents a debit transaction of 20 and this amount is entered into counters #3 and #5 in its positive form and the complement thereof in CTR#4. It will be noted that a change has incidently occurred in the date number and the balance in counters #4 and #5. The balance of 68 in CTR#4 still being the credit balance, this amount is automatically transferred to counter A of the secondary unit where it is added to the 88 already contained therein resulting in 156.

A total printing cycle follows during which CTR#4 controls printing of the balance of 68 in the second line of the report, the CTR#3 to control the printing of the daily debit total on this same line. The following group representing the third day's transaction contains a card having no amount perforations therein. Consequently, no entries are made from such card into any of the amount counters. A change in date again causes a transfer cycle to take place during which the balance of 68 is again transferred to counter A advancing the same to 224 after which the total print cycle takes place and the same balance 68 is printed on the third line of the report. There being no actual transactions for this day, nothing is printed in either of the daily total columns.

In a similar manner the entry of items representing the fourth day's transactions is effected and the balance transferred to counter A and the other totals printed on the report and so also for the fifth day's transactions which are represented by four cards each indicating a debit transaction of 80. After these four items have been entered in the proper counter it will be noted that the status of the account has changed from a credit balance to a debit balance of 172. This change is noted by the machine and such debit balance is accordingly transferred to counter B of the secondary unit and during the ensuing total printing cycle this debit balance amount is printed in the last column of the report as indicated. The transactions for the remainder of the period are similarly distributed in accordance with their character and each day's balance is transferred in succession to either counter A or counter B accordingly as such balance is a credit or a debit balance.

After the last day's transactions for the stated period have been printed and the account number has changed, counter A will contain the sum of the daily credit balances for the period and counter B contains the sum of the daily debit balances for the same period. Counters #1, #2, and #3 will have been zeroized and counters #4, #5 will contain the last daily balance and its complement. A transferring operation is now automatically initiated wherein the total contained in counter A is transferred to the tabulating machine and printed in the daily credit balance column of the report as indicated in Fig. 9. At the same time the daily debit balance column will receive the amount standing in counter B.

Following this printing operation the counters of both machines will be zeroized in preparation to commencing tabulating operations upon the group of cards representing the next account. The final total 372 represents the sum of the daily credit balances and this amount when multiplied by the interest rate per diem will give the amount of interest payable by the bank to the depositor for the period. The total 1157 when multiplied by the amount of interest per diem will result in the interest payable by the customer to the bank for the same period, the difference between the two, of course, being the actual amount payable.

In order to simplify the explanation and clarify the understanding of the problem the separate cards have been represented as being perforated with the amount of the transaction and also with the complement thereof. It is to be understood, however, that translating mechanisms may be included in the machine to automatically translate the amount of the transaction into its complementary value thereby conserving card space and necessitating the perforating of but a single field of the card with the true value of the transaction.

In the problem chosen for explanation it has been presumed that the rates of interest on credit balances and debit balances are unlike, for which reason it has been desirable to separately accumulate them in two counters A and B. However, where the interest rates are the same, mechanism may readily be introduced so that at the time of entry into either of the accumulators in the manner outlined above the complement of this entry may at the same time be introduced into the other counter so that both counters will carry the true balances of the sums of the daily balances. At the end of the tabulating period one of the counters will show a true number and the other will show the complement of the same. The same mechanism which is employed to select the amount to be transferred from either counter #4 or #5 may be utilized to select the positive amount for printing on the report so that at the end of the period a single amount will be printed on the record sheet, this amount being the true figure upon which interest is to be paid and its location upon the record will indicate whether the interest is payable to or by the bank.

The complete electric circuits for the printing tabulator are shown on Figs. 7C and 7D. The machine is entirely similar to that disclosed in the patent to Daly and Page No. 1,762,145, issued June 10, 1930, with the exception of the total taking and automatic control devices which will be described in detail hereinafter. During adding operations the machine is driven by a tabulating motor TM (Fig. 7C) controlled by a group of cam and relay controlled circuits indicated at 10 and is driven during total taking operations by a reset motor RM controlled by a group of circuits, contacts and relays designated generally at 11.

When the tabulating motor TM is in operation it feeds the usual perforated tabulating cards, bearing differentially arranged index points representing digits, first, beneath the upper analyzing brushes UB and exactly one machine cycle later beneath the lower analyzing brushes LB. By means of the group control mechanism indicated generally at GC, groups of cards, as represented by the same data entry in certain selected columns, may be operated upon separately, the items of each group being accumulated and the total of them taken before the machine begins operation on the following card group.

Accumulating units

As the perforated cards pass the lower brushes their index points instantaneously close circuits through the proper lower analyzing brushes LB to energize counter magnets 12 (see also Fig. 7D). As usual the timed energizations of these magnets control mechanism for entering the data corresponding to the card reading on the counter wheels. When any magnet 12 is energized it causes contacts 13 to close energizing a printer magnet 14 to select the type corresponding to the entered data for printing. In this fashion the accumulated items may be listed. These functions do not enter specifically into the present invention and will not be described in detail as they are well understood and fully described and explained in the patent previously mentioned.

Figure 4:
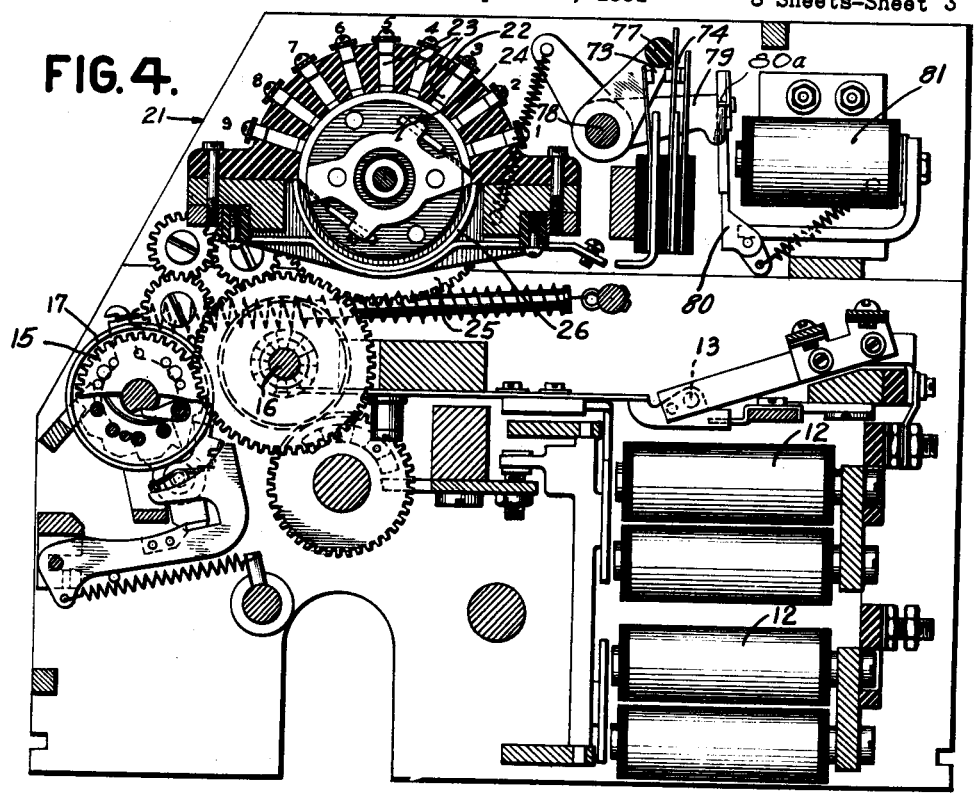
Fig. 4 is a central section through a counter, the section being taken on line 4—4 of Fig. 1.

Referring now to Fig. 4 the counter wheels are represented by gears 15 driven from a shaft 16 under control of the counter magnets 12 as previously stated. As usual indicating wheels 17 are provided, fixed to the gears 15 so that data entered thereon may be visually indicated.

This entering mechanism is identical for all the counters of both units of the apparatus, the magnets 12 of counters A and B being indicated in Fig. 7B.

During total taking operations printing is controlled from counters #1, #2, and #3 by stepped cams and associated contacts 19 in a manner well known in the art.

Counters #4, #5, A and B are provided with improved total taking mechanism indicated generally at 21 in the upper part of Fig. 4 which consists of a commutator 22 provided with segments 23 corresponding in number and position to the several digit indicating positions of the counter wheel 15. A brush structure 24 is mounted on a gear 25 driven by the gear which drives the counter wheel 15 so that the brush structure is angularly displaced according to the reading on the counter wheels. The brush structure 24 carries two brushes one of which engages the segments 23 and the other of which engages a common segmental conductor 26 whose surface corresponds to the configuration of the commutator. These elements are shown diagrammatically in Figs. 7B and 7D. Each of the group of segments 23 corresponding to the same digit is connected to a common conductor 27 whereby all the "9" segments are in multiple, all the "8" segments in multiple, and so on.

Printing mechanism

Figure 2:
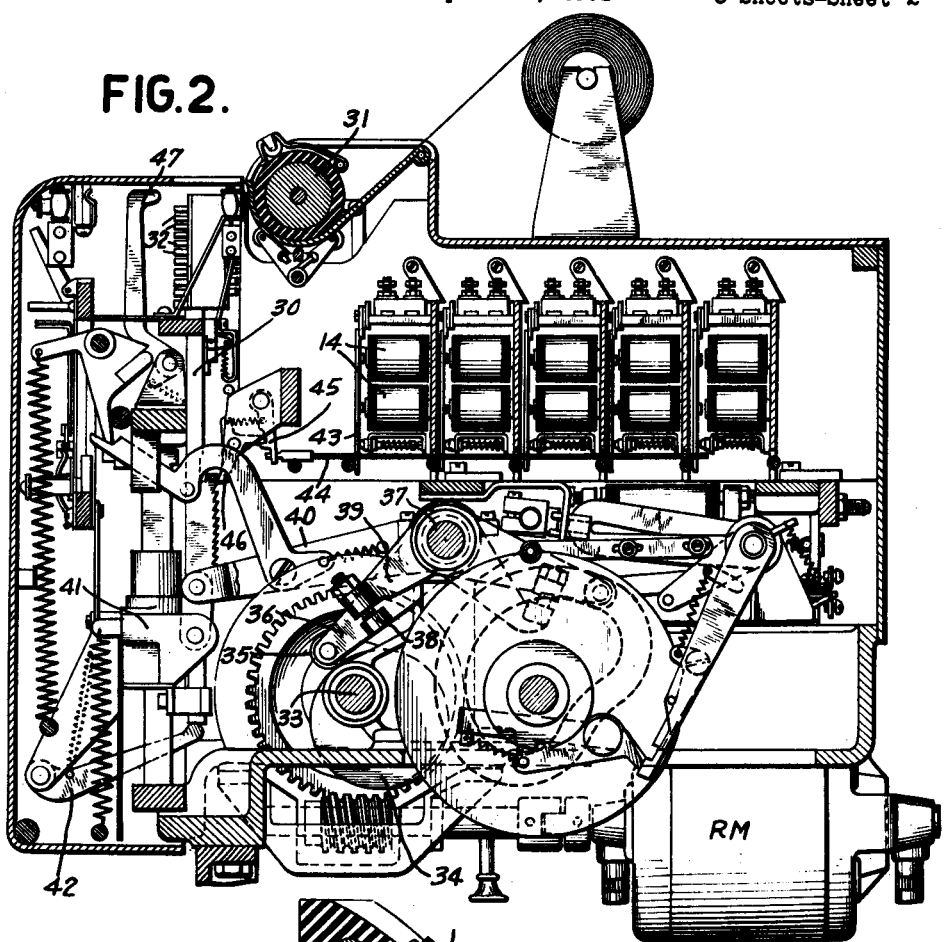
Fig. 2 is a section of the printing mechanism taken on line 2—2 of Fig. 1.

In Fig. 2 is shown the printing mechanism through which the type bar 30 is positioned relatively to the platen 31 to bring the proper type 32 into printing position opposite the platen. The total shaft 33 driven by the reset motor RM is provided with a cam 34 cooperating with a roller 35 carried by an arm 36 freely rotatable on shaft 37.

As the cam rotates counterclockwise, arm 36 rocks clockwise and a lug 38 cooperating with an arm 39 fixed to shaft 37 also rocks clockwise. An arm 40 fixed to shaft 37 is linked to printing crosshead 41 which serves to raise the type bars 30 in synchronism with the total taking mechanism so that the type 32 successively pass printing position opposite platen 31. Owing to spring operated scissors connections 42, however, the type bars 30 may be arrested in any position without interfering with the upward movement of the crosshead 41. The type bar 30 is arrested under control of printing magnet 14. When this is energized it attracts its armature 43 and pulls a call wire 44 to the right thereby releasing a latch member 45 normally holding stop pawl 46. When the pawl is so released it is spring operated to engage the ratchet formed on the type bar 30 to prevent further upward movement of the type bar thus holding a particular type 32 in printing position. The usual printing hammers 47 are provided to impel the type against the platen. Reference may be had to the patent to C. D. Lake, 1,822,594, issued September 8, 1931, for the features of construction of this printing mechanism.

Secondary unit

Figure 1:
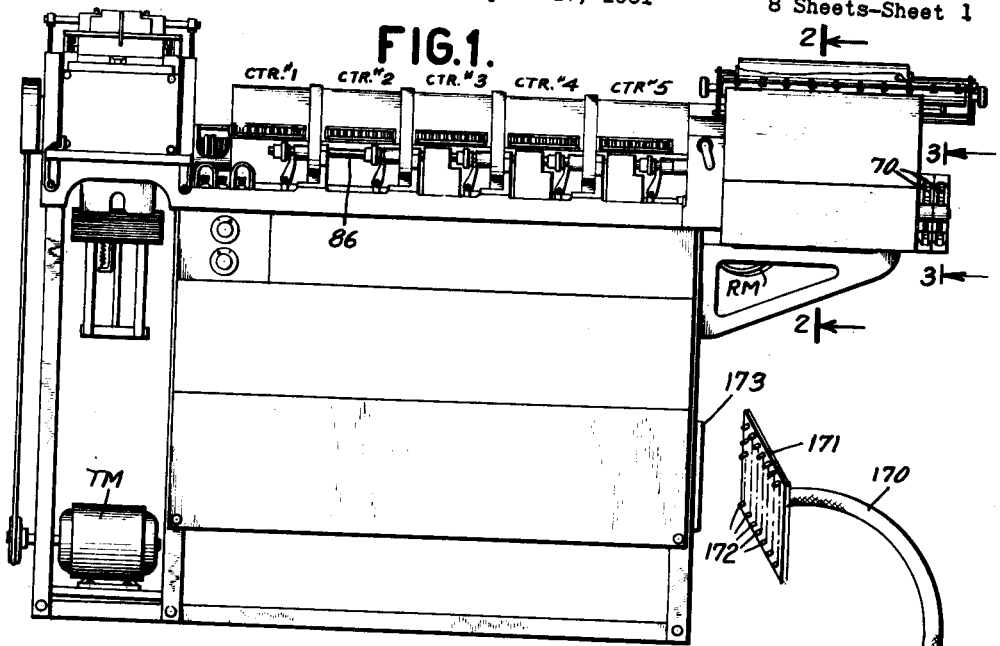
Fig. 1 is a general view of the arrangement of the two-unit apparatus.
Figure 1:
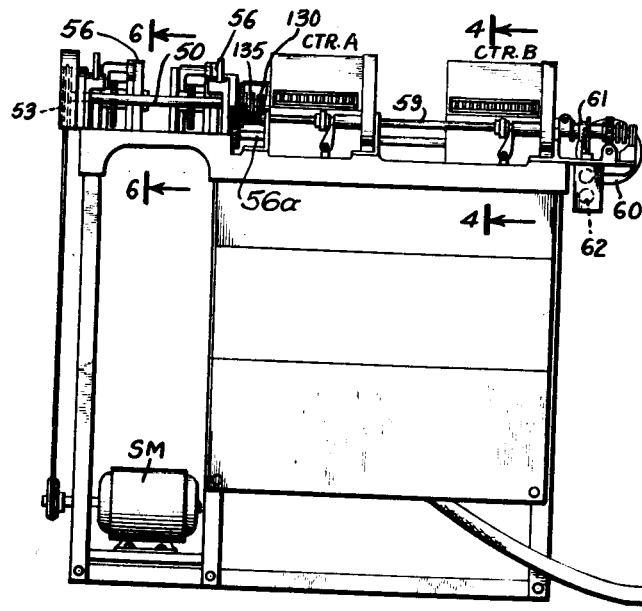
Figure 6:
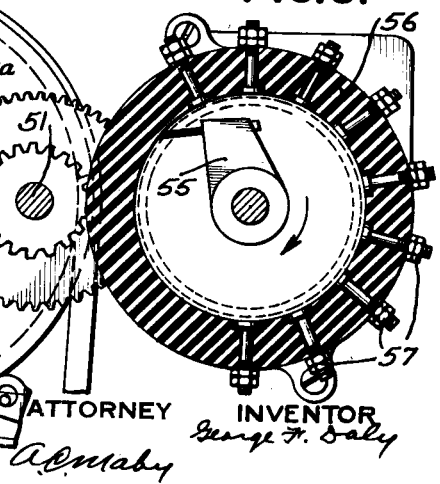
Fig. 6 is a detail of a commutator taken on line 6—6 of Fig. 1.

The secondary unit of the apparatus is shown in Fig. 1 and comprises counters A and B which are driven by motor SM in the same manner as the counters of the tabulator are driven, through the usual pulley shaft 50. The pulley shaft 50 of the secondary unit has clutch connection (see Fig. 6) with a jack shaft 51. This clutch is of the usual half-revolution type shown in Patent 1,600,413 issued to C. D. Lake, September 21, 1926, having a driving element 52 secured to the pulley 53 which is loose on shaft 50.

Energization of magnet 54 (shown on the circuit diagram Fig. 7A) will permit clutching engagement to be effected between the shaft 50 and driving element 52 whereupon shaft 51 will make one complete revolution. Energization of magnet 54 will move latch arm 54a downwardly, releasing latch 54b in a manner set forth in detail in Patent 1,600,413. Latch 54b will thereupon engage continually running element 52 and be rotated thereby a half revolution. The consequent turning of gear 51a through a half revoluation will turn shaft 51 a full revolution due to the ratio of the gear connection shown. Geared to shaft 51 is a pair of commutator brushes 55 and associated commutators or emitters 56. The brushes 55 are geared relatively to the counter drive shaft 56a (Fig. 1) so that they rotate in synchronism with the rotation of the counters A and B of the secondary unit. These emitters 56 are shown diagrammatically in Fig. 7B as being separately associated with the top sections of the counters A and B. During a revolution of brush 55 it contacts successively with insert segments 57 which are electrically connected by wires 27 to corresponding rows of segments 23 of the counters A and B. Through wires 58 the segments 57 are connected also to the corresponding wires 27 of counters #4 and #5.

Referring again to Fig. 1 the usual reset shaft 59 is also provided to zeroize counters A and B during one revolution of said shaft. To this end the reset motor 60 is adapted to drive shaft 59 under control of a one revolution clutch generally designated 61 which is tripped by magnet 62 shown diagrammatically in Fig. 7A.

Total printing emitters

Figure 3:
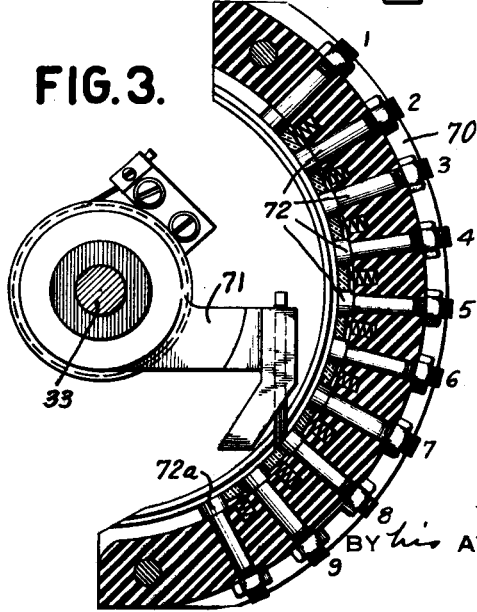
Fig. 3 is a detail of a commutator taken on line 3—3 of Fig. 1.

Referring to Figs. 1 and 3, the devices for emitting the timed impulses synchronized with the movement of the type bars to select the type for printing are shown as consisting of a plurality of arcuate commutators 70 one for each of the counters #4 and #5. Each commutator has associated therewith a brush structure 71 mounted on the total shaft 33. These emitters are shown diagrammatically in Fig. 7D.

Brush 71 is adapted to make one revolution during total printing and during the first half revolution brush 71 contacts successively with insert segments 72 which are electrically connected to corresponding rows of segments 23 of counters #4 and #5. Through wires 58 segements 72 are also connected to the corresponding rows of segments 23 of counters A and B of the secondary unit.

Hence it will be understood that each set of commutator segments 23 of the associated counters receives a timed impulse from an emitter 70 at the time when the type corresponding to the segment is passing the printing line.

As has been previously explained, emitters 56 send similar impulses during transferring operations to segments 23 of counters #4 and #5 to transfer the reading therein to counters A and B and these impulses are differently timed from the impulses from emitters 70 which transfer the readings from the counters #4, #5, A and B to the printing elements. During the operation of emitters 56, emitters 70 are inoperative and vice versa, so that in accordance with the type of operation being performed by the machine the appropriately timed impulses will be transmitted to the counters from which a reading is being taken.

The reason for the two differently timed emitters is the fact that the counters operate on what is known as a 14-point cycle and the printing mechanism, which is driven from a separate motor during total taking operations is operated on a 28-point cycle so that it is necessary for one of the emitters to emit impulses which are timed 1/14th of a cycle apart while the other must emit impulses which are timed 1/28th of a cycle apart. Obviously, if the two mechanisms controlled were operated on similar cycles; that is, if both were 14- or 28-point cycles, a single emitter would suffice.

Circuit switching contacts

A circuit switching device is provided in Fig. 4 which is adapted to control circuits in a manner to be explained in connection with the wiring diagram. One of such devices is associated with each of the counters A, B, #4 and #5. In counters #4 and #5 it consists of a plurality of three-spring contacts 73 and 74, the common or center blade of each being connected to the segmental conductor 26 of the corresponding column of the counters.

Contact 73 is connected in series with the associated printing magnet 14 through wire 75, (see Fig. 7D). Contacts 74 are connected in series with the corresponding counter magnets 12 of counters A and B by means of wires 76 which extend to Fig. 7B.

A common bail 77 (Fig. 4) of insulating material is secured upon a shaft 78 which also carries a spring pressed latching arm 79 adapted to be latched in its clockwise position, as shown, by an armature latch 80 which has a lip 80a hooked above a notch in the free end of arm 79. Energization of magnet 81 will release arm 79 and the bail 77 will rock to permit opening of contacts 74 and closure of contacts 73.

Figure 5:
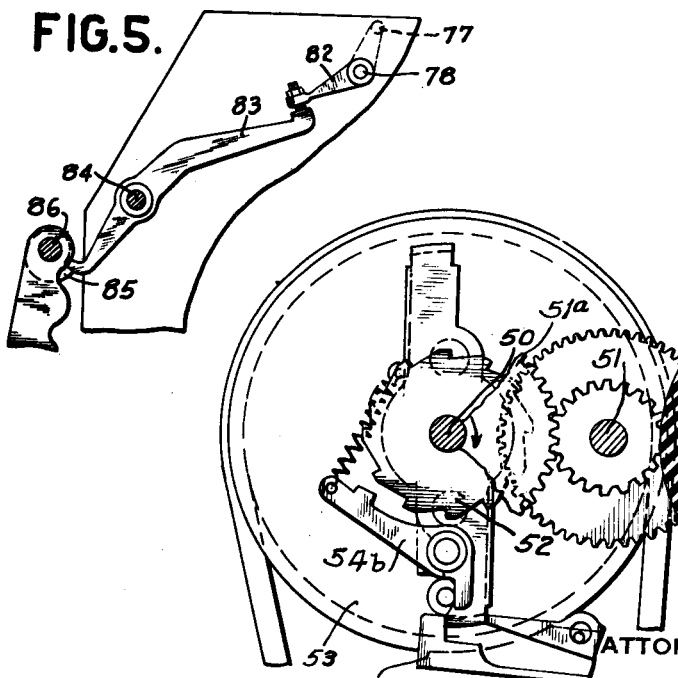
Fig. 5 is a detail of a multi-contact switch resetting mechanism.

In Fig. 5, shaft 78 carries an arm 82 at its extremity which has an adjustable stud in its free end in engagement with an arm of a lever 83 loosely pivoted at 84. The other arms of the several levers 83 cooperate with cams 85 secured upon reset shaft 86 of the tabulator and shaft 59 of the secondary unit. There are two cams 85 on shaft 86 cooperating with counters #4 and #5 and there are two cams 85 on shaft 59 cooperating with counters A and B. The shaft 86 as is fully explained in the Daly and Page patent referred to, is adapted to make a complete turn to zeroize the counters #1 to #5. At such time cam 85 will rock arm 82 through lever 83 to turn bail 77 in a clockwise direction whereupon latch 80 will engage and hold arm 79.

The construction and operation of the switch device in counters A and B is exactly similar with the exception that there is but one contact, namely 87 for each column of the counter. In Figs. 7B and 7D contacts 87 are shown connected to the corresponding printing magnets 14 of counters #4 and #5 through the medium of cables 88.

General features of circuit diagram

It may be explained that in tabulating machines of this type, it is common to utilize cam contact devices for controlling certain circuit operations.

For clarity in the circuit diagram all cam contact devices which are operated in unison and are mounted on common shafts are given similar reference numerals. For instance, there is a group of contacts marked P3, P5, mounted on one shaft; another group marked L1, L11, L12, etc. on another shaft, and so on. All cam contacts are insulated from each other and from the shaft upon which they are mounted. In placing these cams on the diagram they have been located without regard to their mounting upon common shafts in order to obviate the complications of the circuit connections. Similarly for clarity in the diagram, it is necessary to place certain relay contacts at points remote from their controlling coils. In this case the contacts are labelled with the reference character of their controlling coil with a lower case letter appended thereto and the relay coils have been shown in dotted outline adjacent to their respective contacts. This system of numbering does not apply, however, to the so-called multi-contact relays which are magnetically tripped and mechanically restored.

Adding circuits

The wiring diagram will now be explained and the steps involved in the operation of the apparatus to prepare the report of Fig. 9 will now be traced. The report sheet having been inserted in printing position, the cards are placed in the hopper in the order outlined, with the card representing the first transaction of the period, leading.

The circuit shown in Figs. 7C and 7D is modified from the circuit shown in the patent referred to and reference will be made to only such portions as are necessary for an understanding of this present invention.

As a card passes the lower brushes impulses representing the value of the item whether debit or credit and its complement are entered into counters #4 and #5. If the item is a credit item, entry thereof is made in counters #2 and #4 and its complement is entered in counter #5. If the item is a debit item, entry thereof is made in counters #3 and #5 and its complement is entered in counter #4.

The manner of selecting the appropriate counter to receive these items will now be explained. The plug sockets of the lower brushes LB corresponding to the field on the card in which the true value of the item is perforated are connected to sockets 90 of a class selection device comprising triple-blade contacts 91 shiftable under control of a magnet 92. Such connection is made by plug connections at 93. Further connection is made from sockets 94 to sockets 95 of counters #2 and #4 as indicated. Sockets 97 of these contacts are connected to sockets 95 of counters #3 and #5. The plug sockets of the lower brushes corresponding to the field on the card in which the complement of the value is perforated are similarly connected to other sockets 90 of contacts 91a and the corresponding sockets 94a are connected to sockets 95 of counter #5.

Sockets 91a of these contacts are connected to sockets 95 of counter #4.

With this plugging, the general operation of the machine is as follows: As a card passes the lower brushes, each brush which finds a hole in the "true value" field sets up a circuit as follows: from impulse distributor 99 which is connected to right side of line 100, through wire 101, lower brush common 102, hole in the card, brush LB and its socket, plug connections 93, sockets 90, upper contacts 91, sockets 94 to sockets 95 of counters #2 and #4. Similarly perforations in the "complement" field energize magnets 12 of counter #5 through a circuit from the lower brush socket plug connection 93a to plug socket 90 of contact 91a, upper contact 91a, socket 94a to socket 95 of CTR #5.

If before the card is analyzed by the lower brushes LB magnet 92 is energized to shift contacts 91 and 91a opening the upper and closing the lower blades, the same perforations in the "true value" field will through similar plug connections energize magnets 12 of counters #3 and #5 and the perforations in the "complement" field will control magnets 12 of counter #4.

If the card is a debit card, there will be a hole punched in the "X" position of any convenient column on the card and as this card is passing the upper brushes UB a circuit will be closed through such upper brush from line 103, wire 104, cam contact L5, upper brush common, "X" hole, brush UB, plug connection 105 to a socket 106, contacts 107, momentarily closed at "X" position, coil 108 to line 100 through wire 109. A parallel circuit energizes switching magnet 92, shifting contacts 91 and 91a to the reverse of the position shown in Fig. 7C to open the upper contacts thereof. The energization of coil 108 establishes a stick circuit from left side of line 103 through contacts 110, which are closed at this time and remain closed until the end of the adding part of the next machine cycle. The circuit is traced from line 103, contacts 110, relay points 108a, relay 108, wire 109 to line 100.

If, however, the card passing the upper brushes has no hole punched in the "X" position, it is a credit card and magnet 92 will remain deenergized throughout the next succeeding cycle and contacts 91 and 91a will remain in the position shown in Fig. 7C.

In this wise, the special perforation provided for the purpose, informs the machine whether the item on that card is a debit or credit and the machine sets in accordance with that information to distribute the items in appropriate form to the proper accumulators. For such purpose counters #2, #3, #4, and #5 are utilized and will accumulate the credit total, debit total, credit balance, and debit balance respectively of the cards passing through the machine.

It may here be mentioned that translating mechanism may be employed to render the punching of complements unnecessary. Such mechanism may be of the type shown in the British Tabulating Machine Company Patent No. 273,731, issued October 1, 1928, but to simplify the illustration of this invention such translating mechanism has not been included herein.

*Automatic control circuits*

The automatic group control system used in the present machine will be briefly described to bring out certain selective switching features which form part of the present invention. The usual automatic control magnets are shown at 111 (Fig. 7C) and are provided with the usual series contacts to prevent sparking at the analyzing brushes. Each control magnet is adapted to be plugged in series between any upper and lower analyzing brushes to effect automatic control from any card column. The automatic control contacts 112 of which one is associated with each control magnet, are arranged to close individually when the corresponding control magnet 111 is energized and all of them open simultaneously toward the end of each tabulating or listing cycle. When the control perforations on successive cards under the upper and lower analyzing brushes agree, all control contacts 112 which are properly plugged for automatic control, close at some time during the cycle, while when the control perforations fail to agree, one or more of the contacts fail to close.

The automatic control contacts 112 are connected in series and a socket 113 is provided between each pair of them so that any number may be utilized and the control split into major and minor sections at any point. Under such arrangement when a group change occurs in the minor section (i. e. a change in "date") an automatic transfer cycle takes place during which items are transferred to the secondary unit.

Following this, total printing takes place under control of the counters of the tabulator and certain ones thereof are reset. When a group change occurs in the major section (i. e. a change in "account number") the same procedure follows as on a minor change and in addition, following the printing of items from the counters of the tabulator, the totals are printed from the counters of the secondary unit and the entire apparatus zeroized.

Cam control contacts L11 govern the operation of the machine under major control and cam control contacts L12 govern the operation of the machine under minor control. Both of these contacts are normally closed but open an instant towards the end of each tabulating or listing cycle. The contacts L11 may be plugged in parallel with the control contacts 112 selected for major control and the contact L12 may be plugged in parallel with the control contacts 112 selected for minor control. As shown, contacts L12 are in parallel with minor automatic contacts 112 numbered from 1 to 3 and contacts L11 are in parallel with the other major automatic contacts 112. These parallel connections through contacts L12 and contacts 112 are traceable in one direction from switch 114, to the left to contacts L12 and L11 to line 100. In the other direction, the parallel circuit flows from switch 114, serially through the first five contacts 112 to relay contacts 116a and line 100. In this manner a circuit may branch at switch 114 in two directions, both branches leading to line 100. The shunt formed across cam contacts L11 by major control contacts 112 (fourth and fifth contacts 112) extends from the upper terminal of contacts L11 to the blade of switch 115 which is plugged to one terminal of the series connected major control contacts, thence through the major control contacts 112 whose other terminal is plugged to upper card lever relay contact 116a, closed by cards under the upper brushes as long as major group control is operating, thence to line 100, back to the other terminal of cam contacts L11. The switches 114 and 115 for this operation should be in open or dotted line position. The parallel connection including the major control contacts 112 and cam contacts L41 is in series with a major control relay 117, while the parallel connection including the minor control contacts 112 and cam contacts L12 is in series with a minor control relay 118.

The major control relay is provided with back contacts 117a and front contacts 117b while the minor control relay is provided with back contacts 118a and front contacts 118b. The front contacts of the major and minor control relay connect the relay coils directly to main line 103. The stick circuit for the major control relay extends from main line 103, through front contacts 117b and major control relay 117 and through the above traced parallel connection of cam contacts L11 which includes major automatic control contacts 112 to the main line 100. The circuit also follows from relay 117 directly through contacts L11 to line 100. This circuit will be interrupted to deenergize the major control relay 117 by the opening of cam contacts L11 at the end of any listing or tabulating cycle during which any of the major automatic control contacts 112 fail to make due to disagreement of major classification perforations on the controlling records.

The stick circuit for the minor control relay 118 extends from main line 103, front contacts 118b, minor relay coil 118, zero button control magnet 119, coils 120 and 125 to switch 114. This switch is connected to main line 100, through the connections containing cam contacts L12, and L11 and minor automatic control contacts 112 and also through the major automatic control contacts 112. It will thus be obvious that a change in the major group data deenergizes both major and minor control relays at the end of the cycle while a change in minor group data alone deenergizes the minor control relay only. This is due to the fact that the minor control circuit extends serially through both the major and minor contacts 112 and failure of any one of these interrupts the minor control circuit thus deenergizing relay 118. If the contact failing to close is of the minor group, only the minor circuit is affected and the major control circuit is maintained through the two major contacts 112. If either of these fails to close, the circuit is interrupted and the major control relay 117 is deenergized as well as minor relay 118. Deenergization of these relays of course opens their front contacts 117b and 118b and closes their back contacts 117a and 118a.

The ultimate result of thus deenergizing the major and minor control relays is to force two reset cycles by the former to permit successive major and minor total printing and to force only one reset cycle by the latter. The back contacts 117a of the major control relay connect the usual motor control relay 122 and the reset control magnet 123 to the main line 100 and the back contacts 118a of the minor control relay connect them to the main line 100 through a parallel circuit. The first circuit runs from line 103, contacts 117a, relay coils 122, 123, 124, 121, and 126 to line 100. The second runs from line 103, contacts 118a, relay coils 122, 123, 124, 121, and 126 to line 100. Deenergization of either the major or minor control relay, then by closing contact 117a and 118a, respectively, energizes the motor control relay 122 and reset control magnet 123 and they remain energized until both the major and the minor control relays are again energized to cause opening of the contacts 117a and 118a. As explained in the patent to Daly and Page referred to, energization of motor control relay 122 opens its contacts 122a to stop the tabulating motor and prevent its restarting until the motor control relay 122 is again deenergized. The energization of reset control magnet 123 opens its contacts 123a to prevent the cam contacts P5 from taking control of the reset motor thus forcing successive reset cycles until the reset control magnet 123 is again deenergized.

During each reset cycle cam contacts LP1 make and break and directly after they break, cam contacts LP2 make and break. Cam contacts LP1 connect major control relay 117 to the line 103 through the front contacts 118b of minor control relay 118. Hence the closure of cam contacts LP1 energizes major relay 117 only if the minor relay has been previously energized to close contacts 118b and, as deenergization of the major control relay always entails deenergization of the minor control relay, the closure of these contacts during the first reset cycle is of no effect since contacts 118b are open at such time.

The closure of cam contacts LP2 during the first reset cycle reenergizes the minor control relay 118 which in turn re-establishes its stick circuit. The reenergizing circuit follows from line 103, contacts LP2, relay magnets 118, 119, 120, and 125, contacts L12, L11 to line 100. The stick circuit is traceable from line 103, contacts 118b (closed by energization of magnet 118), magnets 118, 119, 120, 125, contacts L12, L11 to line 100. If the major control relay is energized at this time with its back contacts 117a open which will be the case if a group change has occurred in the minor control section alone, this energization of the minor control relay opening its back contacts 118a breaks the circuit of motor control relay 122 traced above and reset control magnet 123 and contacts 122a and 123a close permitting interruption of reset and resumption of tabulating after a single reset cycle. This interruption is effected upon closure of contacts P5 which due to the closure of contacts 123a, will complete a circuit from line 103a, motor RM, contacts P5, 123a to line 100. The reset clutch magnet 137 is thereby short-circuited and resetting operations will come to a halt at the end of the cycle. If the major control relay has been deenergized; at the end of the first reset cycle its back contacts 117a provide a circuit for the motor control relay 122 and the reset control magnet 123 holding their contacts open to force a second reset cycle. The open condition of contacts 123a prevents the closure of contacts P5 from completing the short-circuit so that a second reset cycle will automatically follow the first. During this second cycle the closure of cam contacts LP1 effects energization of major control relay 117, through a circuit traceable from line 103, contacts 118b (now closed), contacts LP1, relay magnets 117, 156, contacts L12, L11 to line 100 establishing its stick circuit through contacts 117b and opening its back contacts 117a to deenergize motor control relay 122 and reset control magnet 123. The reset is then interrupted at the end of the second cycle and tabulating may be resumed.

The major and minor control features are not limitations in the machine as they can be incapacitated, if desired, and the machine operated either under straight automatic control or last card operation. The switch 115, if closed, short circuits the cam contacts L11 and throws the entire bank of automatic control contacts 112 in parallel with the cam contacts L12. It also furnishes a current path for the major control relay exclusive of the contacts L11 and any of the automatic control contacts 112. Under these conditions the major control relay 117 remains energized constantly and the minor control relay 118 controls the machine for straight automatic control.

If the switch 114 is closed as well, a permanent current path is also provided for the minor control relay to maintain it constantly energized and the machine is adapted for last card operation if none of the magnets 111 is connected in series with any column of upper and lower brushes.

From the foregoing it is apparent that during the tabulation of the first group of cards the magnets 118, 119, 120 and 125 in the minor control circuit are continuously energized and magnets 121, 122, 123, 124, and 126 in the major circuit are continuously deenergized.

Upon change in the minor group number, namely "date", relay coil 118 becomes deenergized together with magnets 119, 120 and 125. Shifting of relay points 118a, 118b to close 118a will energize coils 121, 122, 123, 124, and 126. Coil 122 will cause opening of its points 122a in the control circuit of the driving motor TM to cause stoppage of the tabulator. Energization of coil 121 will cause its points 121a to close so that when cam contacts L1 close toward the end of the last adding cycle the following circuit is completed to initiate a cycle of operation of the secondary unit: From line 103a (Fig. 7A) of the secondary circuit, closed points 127a of interlock relay coil 127, wire 129, contacts 131, clutch magnet 54, relay coil 132, wire 133 (Fig. 7C), cam contact L1, points 121a, wire 134 (Fig. 7A), cam contacts SL1 now closed, to right side of line 100a. A stick circuit follows from line 103a, points 127a, wire 129, contact 131, magnet 54, coil 132, points 132a, contact SL1, to line 100a.

Upon energization of magnet 54, contacts 131 open and coil 130 is included in the circuit. Coil 130 closes its points 130a to complete the motor circuit from line 103a, points 130a, motor SM to line 100a. The motor SM of the secondary unit is now in operation to drive counters A and B and emitters 56 are also in operation.

During this cycle the positive balance from either counter #4 or #5 is transferred to either counter A or B in a manner to be explained presently. During this cycle contacts SL1 open to break the clutch and motor circuits and bring the secondary unit to a stop. Toward the end of the cycle, cam contacts SL2 close momentarily to initiate a total print and reset cycle of the tabulator as follows: From line 103 (Fig. 7C), motor RM, reset clutch magnet 137, contacts 138, wire 139 (Fig. 7A), contacts SL2, wire 140, points 123b of coil 123 (now closed) auto reset switch 141, stop key 142, contacts P3, back to line 100. This initiates a regular total print and reset cycle of the tabulator in the usual manner, during which totals are printed as on the first line of Fig. 9 and counters #2 and #3 are reset to zero. During this reset cycle cam contact LP2 closes to set up the minor control circuit again and tabulating resumes on the next group of cards.

*Transferring circuits*

Before transferring the amounts from counters #4 or #5 to counters A or B it is first necessary to determine which of the balance counters contains a true number and which one contains a complement, since only the true number is to be transferred. This true balance is indicated by a "0" in the highest order of the counter and a complement by a "9" appearing in that same position. This fact is utilized as follows to bring about the transferring of the true balance.

In Figs. 3 and 7D the emitters 70 are provided with a special insert segment 72a with which the brushes 71 are in contact during tabulating operations. Segments 72a are wired to each other and also to one of the segments 23 in the "9" position of the read-out commutators. The connected segment 23 is that in the next to the highest denominational order position.

Assuming CTR#5 to contain a complement, the brushes 24 of the highest orders will be positioned to bridge the "9" segments 23 and the corresponding conductor strips 26.

At the start of any minor change operation magnet 120 (Fig. 7C) is deenergized as pointed out above, and its contacts 120a, 120b shift to the position shown in Fig. 7D.

Also, magnet 126 is energized to close its points 126a in Fig. 7D. Immediately upon a group change the following circuit may be traced, from line 103 (Fig. 7D), wire 143, brush 71 of CTR#5, segment 72a, wire 144, "9" spot 23 in the next to the highest denominational order, brush 24 (set at "9") conductor 26, wires 145, 146 (Fig. 7B), relay 147, wire 148, points 126a (Fig. 7D), wire 226 (Fig. 7C), cam contact P3 to line 100. Had CTR#4 contained a complement, a similar circuit would have been initiated to energize relay 149.

Energization of relay 147 (Fig. 7B) opens its points 147a to disconnect brush 55 from line 103a. This circuit is maintained until contact P3 opens during the subsequent total printing cycle of the tabulator.

The actual transferring of data from CTR#4 to CTR—A will now take place. The brush sets 24 of CTR#4 have, during the previous tabulating operations of the machine, been positioned according to the data reading of their associated adding wheels. Consequently one brush of the set rests upon a commutator segment 23 corresponding to the reading of its wheel and the other brush of the set rests on the segmental conductor 26 which is connected to the corresponding denominational order adding magnet 12 of CTR—A through contact 74 and wire 76 (Figs. 7B and 7D). The emitter 56 of CTR—A which is driven during the operation of the secondary unit brings its brush 55 successively into cooperation with commutator segments 57 so that each of the wires 58 and consequently wire 27 of CTR#4 receive an impulse at the counter time corresponding thereto.

As brush 55 engages the "9" spot 57, counter A is in position to be tripped for an entry of "9". The circuit extends as follows: From line 103a, (Fig. 7B), relay points 149a, brush 55, "9" spot 57, wires 58 and 27 to all the "9" segments 23 (Fig. 7D) of the CTR#4 commutators. If "9" is to be transferred, a brush 24 will be in contact with this "9" segment and the circuit will be extended through the brush set 24 and segmental conductor 26 to contact 74, thence through wire 76 to magnet 12 and back to line 100a through cam contact SL5 which is closed during transferring operations. In this fashion all orders standing at "9" will trip the corresponding magnets 12 of CTR—A at the 9 position of the counter. The remaining magnets 12 will be tripped in a similar manner, according to the setting of the brush set 24 which corresponds to the counter reading. Thus in a single revolution of emitter 56 all the data in CTR#4 may be transferred to CTR—A. The same procedure will take place under control of emitter 56 of CTR—B when CTR#5 contains a true balance.

Toward the end of the cycle of operation of the secondary unit cam contacts SL3 and SL4 (Fig. 7B) close to set up a circuit to prepare the tabulator to print the true balance from either CTR#4 or CTR#5 as the case may be. Assuming CTR#5 to contain the complement a circuit extends at this time from line 103 (Fig. 7D) wire 103, brush 71 of CTR#5 segment 72a, wire 144, commutator segment 23 and conductor 26 to wire 145, thence through wire 150 (Fig. 7B) contact SL4, wire 151, trip magnet 81—4 of CTR#4, contact 74a, wires 152, contact 120b, contact LP10 to line 100. Had CTR#4 contained the complement a similar circuit would have energized trip magnet 81—5 of CTR#5. Energization of magnet 81—4 will cause shifting of contacts 74, 73 from the position shown in Fig. 7D to close 73 and open 74 and contacts 74a will open to break the circuit just traced.

The tabulator now enters upon the total printing and resetting cycle as already explained during which the type bars rise to printing position and emitter brushes 71 rotate with the total shaft 33 (Fig. 3). Brush 71 of CTR#4 makes contact successively with segments 72 of commutator 70 so that each of the wires 27 of CTR#4 receives an impulse at the time when the type corresponding to them is passing printing position. For those columns in which brush 24 stands at "9" the circuit extends as follows: from line 103, wire 153, brush 71, segment "9", wire 27, segment 23 and conductors 26, contact 73 now closed, wire 75, print magnet 14, wire 154, contact LP4 (now closed) to line 100. In this fashion all type which are to print "9" will be positioned opposite the platen. The remaining type will be selected in a similar manner according to the setting of the brush set 24 which corresponds to the reading of CTR#4. Thus in a single traversal of segments 72 all type which are to total print under control of CTR#4 will be properly positioned opposite the platen to completely print the true balance represented on the several counter wheels.

At the same time totals are printed from CTR#2 and CTR#3 under control of the usual stepped cams 18 in well-known manner. Following total printing counters #2 and #3 are zeroized in the usual manner and tabulating recommences on the next group of cards as outlined above.

*Major group control*

The above procedure of tabulating a minor group of cards, transferring the balance to the secondary unit, total printing from the tabulator and resetting certain counters, continues until a change in the major group designation occurs.

Upon the happening of this event the same series of operations will first take place as for a minor group change. That is, the last daily balance will be transferred to the secondary unit and also printed in the appropriate column of the record sheet. However, the resetting operation initiated with such total printing will continue for a second cycle during which the sum of the balances in CTR—A and CTR—B will be printed and the entire apparatus reset to zero.

Referring now to Fig. 7C, upon change in the major class number both minor and major relays 118 and 117 will become deenergized. The incidental energization of magnet 121 will initiate the operation of the secondary unit as already explained. Deenergization of magnet 120 will prepare the multi-contact trip magnet circuits in Fig. 7D and deenergization of magnet 119 will permit the opening of its points 119a (Fig. 7C) to interrupt the circuits to the zero button magnets 155. A magnet 156 in series with major control relay 117 is adapted when said magnet is energized to hold its points 156a open and upon deenergization of the magnet to permit them to close. Magnets 121, 122, 123, 124, and 126 will have become energized upon a major group change; magnet 122 interrupting the operation of the tabulator and magnet 126 setting up the balance selecting circuits heretofore traced.

In Fig. 7C the cam contacts LP2 and LP1 are controlled by the reset mechanism of the tabulator and are adapted to close momentarily during reset operations in succession, LP1 closing and opening again before LP2 closes.

Thus during the reset cycle following the total printing which takes place as in the event of a minor group change, the closure of contact LP2 will complete a circuit from line 103, cam contact LP2, minor control relay 118, magnets 119, 120, 125, to switch 114, and thence back to line 100 in a familiar manner. The closure of contacts LP1 have no effect upon the circuits prior to the setting up of the minor control relay since a circuit through such contacts must be completed through points 118b of the minor control relay 118. Thus during this first reset cycle, magnets 119, 120, 125 are again energized. Magnet 120 shifts its contacts 120a, 120b (Fig. 7D) to their alternate position and energization of magnet 125 has caused closure of its points 125a. Upon reclosure of cam contact LP10 during the first reset cycle, the following circuit will ensue: from line 100 (Fig. 7D), contact LP10, contact 120a, wire 157 (Fig. 7B), trip magnets 81—A, 81—B, wire 158, relay points 125a, wire 159, back to line 103. Energization of magnets 81—A, 81—B will cause closure of their related contacts 87 to prepare the total printing circuits to be traced later.

Referring now to Fig. 7C, the usual cam contact P5 is provided to close during each reset cycle and whose function is to short circuit the reset clutch magnet 137 so that the reset motor RM will come to rest at the completion of the cycle. However, energization of magnet 123 in the major control circuit will hold points 123a open, these points being in series with cam contact P5 to prevent such short circuiting of the reset clutch magnet and the reset mechanism will enter upon a second cycle of operation.

During the second cycle, cam contact LP1 upon closure will complete a circuit from line 103, contacts 118b now closed, contact LP1, major control relay 117, magnet 156 to contact L11, and thence to line 100. The incidental deenergization of magnet 123 will permit closure of its points 123a so that cam contacts P5 may now cause the reset mechanism to come to a stop after having completed this second cycle.

The circuits involved in transferring the reading of counters A and B to the printing mechanism will now be traced. During the second reset cycle the emitter brushes 71 of the commutators 70 again traverse the segments 72 during the first half of the cycle and successive impulses are transmitted to the wires 58 in the now familiar manner, and thence to wires 27 on the commutators of counters A and B. In accordance with the setting of brushes 24 in these counters the circuits continue through the now closed contacts 87, cables 88, to the printing magnets 14, and thence to line 100.

Following the transferring of the amounts from the counters A and B, and while the tabulator is resetting, the automatic reset cycle of the secondary unit is effected in the following manner: During the first reset cycle of the tabulator, magnet 124 is energized causing closure of its points 124a in Fig. 7D and later upon closure of cam contact LP9 a circuit is completed from line 103a (Fig. 7A), wire 162, to relay points 124a (Fig. 7D) thence through wire 160, contact LP9, wire 161 (Figs. 7C and 7A), relay coil 163, contacts SP2, back to line 100a. This causes closure of relay points 163a so that in the following cycle on closure of cam contact LP8 in advance of LP9 in the tabulating machine the circuit is established from line 103a, points 163a, wire 161, cam contacts LP8, wire 164, relay coil 127, coil 128, reset magnet 62, cam contacts SP2, to line 100a.

The energization of coils 127 and 128 will shift their respective contacts 127a and 128a. Closure of contacts 127b will establish a stick circuit through the relay coil and clutch magnet 62 until contact SP2 on the reset shaft of the secondary unit opens. Closure of relay points 128a will complete the circuit through the reset motor 60 which circuit is so maintained until the coil 128 is deenergized. At such time, however, cam contact SP1 continues to hold the motor circuit breaking it at the proper time to bring the parts to rest in home position.

The resetting of counters 4 and 5 of the tabulator is effected by means of the usual zero button magnets 155 indicated in Fig. 7C. These magnets are adapted to connect these counters to the reset shaft upon energization. Since relay points 156a are closed during the first reset cycle, closure of cam contacts LP11 will complete a circuit through magnets 155 from line 103, wire 166, cam contacts LP11, magnets 155, relay points 156a, wire 167, to line 100. This will cause resetting of counters 4 and 5 during the first reset cycle following a major group change.

*Independent tabulator operation*

The secondary unit may be entirely disconnected from the tabulator and the latter employed in the usual manner to accumulate totals and print the same upon record sheets. To this end all the connections shown diagrammatically as running from Figs. 7A, 7B, to Figs. 7C, 7D have been gathered in a common cable 170 (see Fig. 1) which terminates in a switching block 171 provided with a plurality of jacks 172 which when inserted in a companion block 173 mounted on the tabulator will complete the connections between the two units as indicated on the circuit diagram. Several switches are also provided in the tabulator which when manipulated will render the tabulator separately operable without disconnecting the cable 170.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefor to be limited only as indicated by the scope of the following claims:

I claim:

1. In a record controlled accounting apparatus, in combination, means for analyzing promiscuously arranged records bearing positive and negative amounts, an accumulator in which all positive amounts and complements of all negative amounts are added; an accumulator in which all negative amounts and complements of all positive amounts are added, a balance accumulator associated with each of said first mentioned accumulators and under the control thereof, automatic group control mechanism and controlled thereby, means for transferring the true total from whichever of said accumulators bears a true amount to its balance accumulator and means automatically controlled by one of said first two accumulators for suppressing the transferring of the other of said totals.

2. In a machine of the character described, in combination with a plurality of accumulator elements, means for adding on said elements true amounts and complementary amounts, group control mechanism, devices controlled by said group control mechanism for sensing a particular one of said elements to determine whether the total standing on the elements is a true or complementary number, a totalizer adapted to be controlled by said elements, and means including electrical circuits under control of said sensing devices for transferring said total to said totalizer only if it be a true number.

3. In an accounting system of the class described, an accounting machine having an accumulator, a second accounting machine also having an accumulator, said machines being separately arranged and having independent, non-synchronous driving mechanisms, an emitter included in said second named accounting machine for emitting impulses representative of the several digits, means associated with the accumulator of said first machine for selecting for control of the second accumulator only such digit impulses as correspond to the numerical value represented on the first accumulator and means controlled in accordance with the amount standing on said first-named accumulator for preventing the effective operation of said emitter.

4. In an accounting system of the class described, an accounting machine having an accumulator, automatic control mechanism, and resetting mechanism for said accumulator, a second accounting machine having an accumulator; means for transferring the reading in said first accumulator to said second accumulator; separate driving mechanism for each machine, means for initiating a cycle of operations of said first machine, means controlled by the automatic control mechanism for interrupting said cycle of operations and initiating a cycle of operation of said second machine wherein said transferring operations take place; and means controlled by said second machine for operating the resetting mechanism of said first machine to reset said first-named accumulator.

5. In combination, a tabulating machine provided with a totalizer and total taking mechanism, an accounting machine separate from said tabulating machine and having a totalizer adapted to receive entries under control of the totalizer of said tabulating machine, means effective upon initiation of a total taking operation of the tabulating machine for initiating an operation of the accounting machine to control its totalizer in accordance with the total standing in the totalizer of the tabulating machine and means controlled in accordance with the amount standing on the first-named totalizer for preventing the control thereby of the second-named accumulator.

6. In an accounting system of the class described, a tabulating machine including minor and major group control mechanism, printing mechanism and a totalizer; a supplemental totalizer separately located with respect to said tabulating machine; means operative upon a minor group change for transferring the total in the tabulating machine totalizer to the supplemental totalizer, and means operative upon a major group change for effecting such a transfer and subsequently retransferring the total in said supplemental totalizer to said printing mechanism.

7. In an accounting apparatus of the class described an accounting machine having an accumulator and automatic control mechanism; a second accounting machine having an accumulator; means for transferring the reading in said first accumulator to said second accumulator; separate driving mechanism for each machine; means for initiating a cycle of operation of said first machine, means controlled by the automatic control mechanism for interrupting said cycle of operations and initiating a cycle of operation of said second machine wherein said transferring operations take place.

8. In a record controlled machine, a pair of separate, independently operable, accumulators, a separate read-out device for each accumulator, a second pair of separate accumulators, each normally associated with the read-out device of one of said first-named accumulators, means controlled by either of said first-named accumulators for dissociating its read-out device from its related second accumulator and means for transferring the amount on the other of said first-named accumulators to its related second accumulator.

9. In a record controlled machine, a sending accumulator and a receiving accumulator each having read-in and read-out mechanism, electrical connections between the read-out mechanism of the sending accumulator and the read-in mechanism of the receiving accumulator, transfer controlling mechanism adapted to enable said connections for transferring an amount from one accumulator to another and means controlled by the read-out mechanism of said sending accumulator for preventing the enabling of said electrical connections.

GEORGE F. DALY.